E. SHEER.
AUTO LUGGAGE CARRIER.
APPLICATION FILED JULY 26, 1921.
1,429,112.
Patented Sept. 12, 1922.
3 SHEETS—SHEET 1.
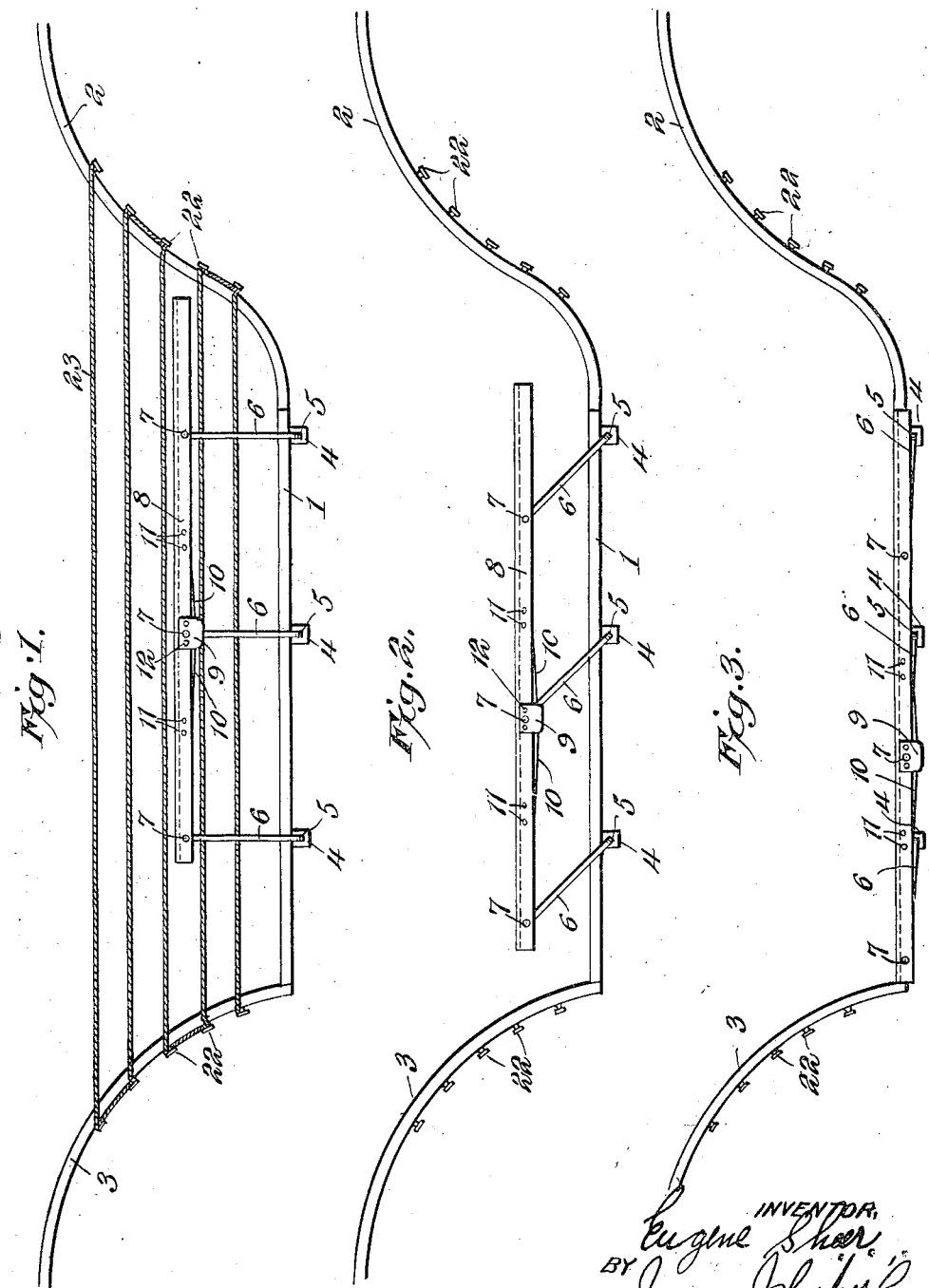

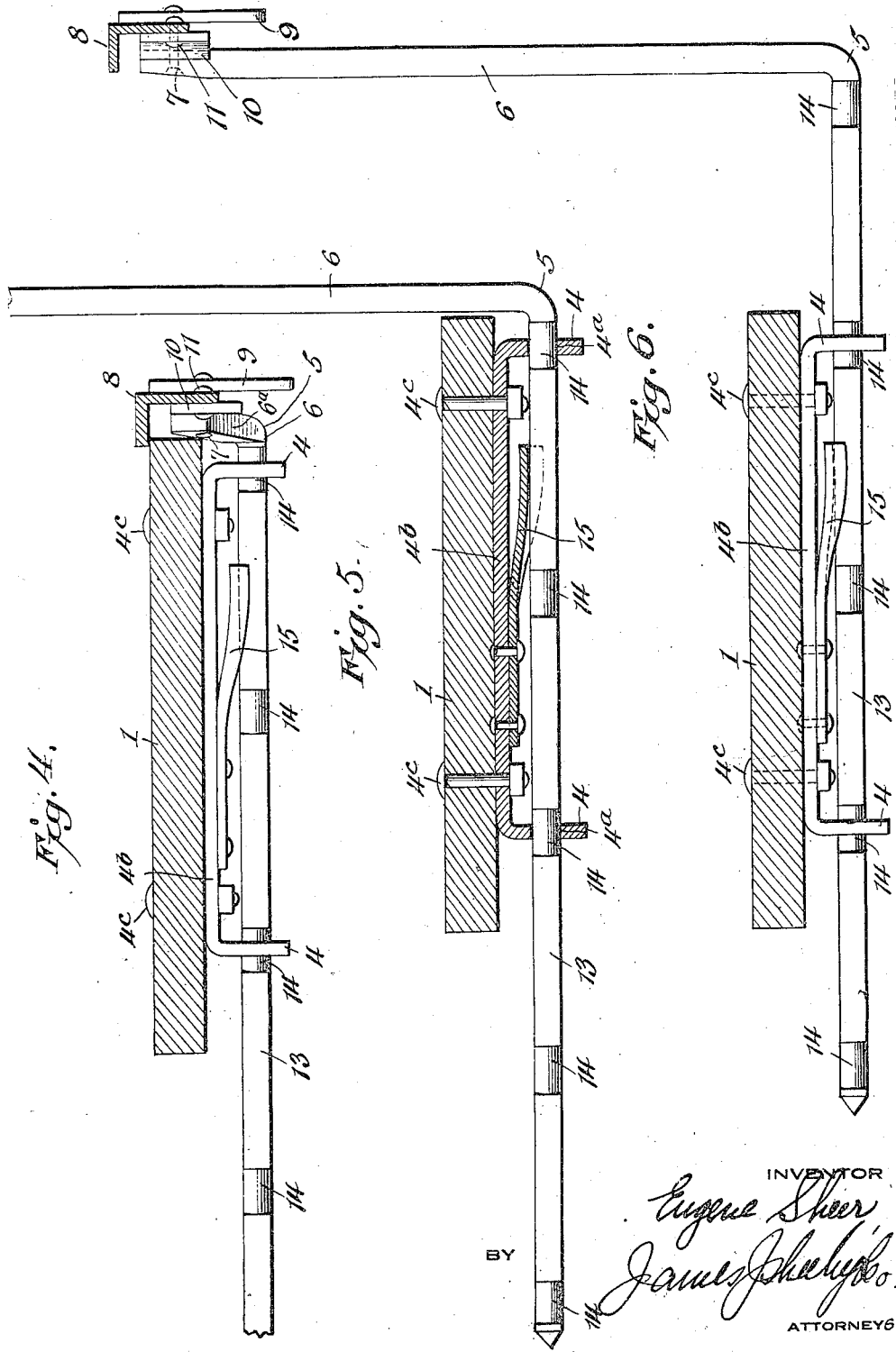

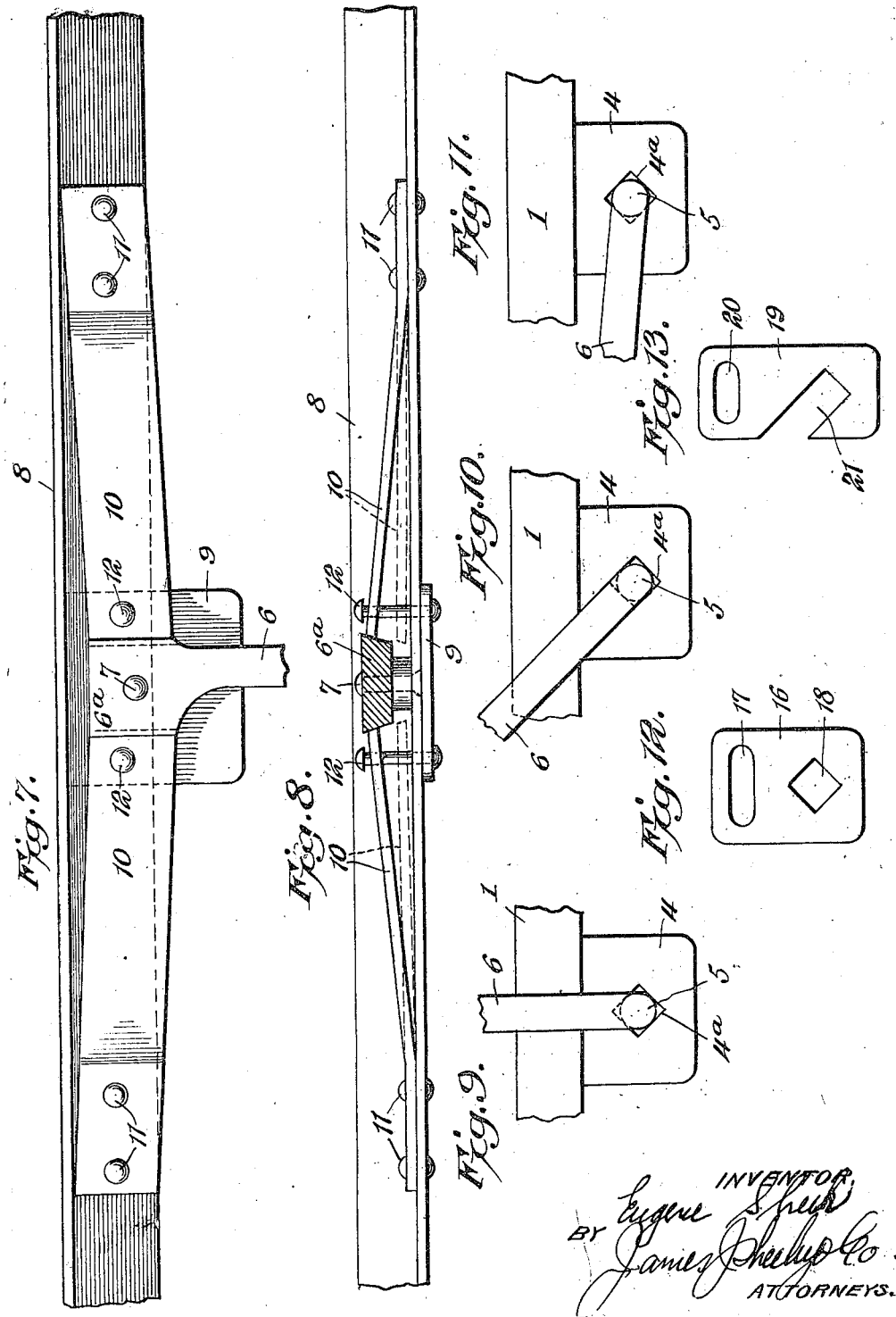

Patented Sept. 12, 1922.

1,429,112

UNITED STATES PATENT OFFICE.

EUGENE SHEER, OF LINCOLN, ILLINOIS.

AUTO LUGGAGE CARRIER.

REISSUED

Application filed July 26, 1921. Serial No. 487,676.

*To all whom it may concern:*

Be it known that I, EUGENE SHEER, a citizen of the United States, residing at Lincoln, in the county of Logan and State of Illinois, have invented new and useful Improvements in Auto Luggage Carriers, of which the following is a specification.

My present invention pertains to luggage carriers for use in connection with motor vehicles and the like, and it contemplates the provision of a device that may be readily and easily extended above the running board of motor vehicle, and as readily and easily returned to its initial position where it will be practically invisible.

The invention further contemplates the provision of a luggage carrier that may be made large or small in the discretion of the user when occasion requires the carrying of a large or small article.

The invention further contemplates the provision of a device for the purpose set forth, that is simple in construction and one that will add, rather than detract from the finished appearance of an automobile or the like.

Similar numerals of reference designate corresponding parts in all of the views of the drawings.

Figure 1 is a side elevation showing my novel device attached to the underside of a running board and in its operative position.

Figure 2 illustrates the carrier partly extended ready to draw out to make carrier larger.

Figure 3 shows the position the device assumes when in its folded position.

Figure 4 is a detail view of the adjustable rods of my carrier and shows the bearing thereof in a closed position.

Figure 5 is a similar view showing the device in extended position.

Figure 6 is a similar view showing the device in extended position, and drawn out one notch to enlarge carrying capacity.

Figure 7 is a view from back showing the manner in which the bearing and rods are secured when the invention is in operation.

Figure 8 is a similar edge view showing the rods in operative position.

Figure 9 is a detailed view of the rod and the bearing therefor, when in operation.

Figure 10 is a similar view to Figure 9 partially extended to enlarge.

Figure 11 is a similar view to Figure 9 extended.

Figures 12 and 13 are detailed views of the various form of hooks I use in connection with the carrier for holding the rope I employ in connection with the invention.

Similar numerals of reference designate corresponding parts in all of the views of the drawings.

My novel carrier is secured to the underside of the running board of a motor vehicle or the like, but should it happen that said running board was of such construction that it would not permit of safe carrying of a large and heavy article thereon, brace rods may be secured to the underside of the vehicle to receive the carrier.

The said carrier comprises the bearings $4^b$ that are secured at various lengths or distances throughout the running board 1 and are provided with the integral hangers 4 that are provided with the square opening, or same as general shape of L rod 13, for bearing portions $4^a$ as shown.

This bearing as before set forth is duplicated at equidistant points throughout the length of the running board and is secured thereto by means of rivets or bolts $4^c$.

Adapted to be turned in the bearings $4^b$ is a rod of L shape form in cross section and indicated by 13. The rod 13 is provided with the round bearing surfaces 14 and the rounded surface 5 and the upstanding arm or portion 6. I would have it distinctly understood that the rod 13 is preferably square throughout, (but can be any other shape), except at the point where the rod takes into the square opening of the bearing $4^b$.

On the upper end of the portion 6 of the rod 13 I provide preferably, angle bar 8 that is pivoted to the end of the rod 13.

It will be manifest that the rod 13 having rounded surfaces 14 is adapted to turn in the bearing 4 because of this rounded provision, but I would distinctly have it understood that the rod 13 is not adapted to turn or be casually displaced from the bearing when the rod is in a vertical or horizontal position with respect to the running board 1.

The angular arm 8 is preferably of steel and is fastened to the upper end of the rod 13 by means of a rivet or bolt 7 in such manner that it may be dropped to the running board 1 or raised and lowered after the manner of a crank motion.

The end of one or more of the rods 13 is also provided with an enlarged square portion $6^a$ that is secured by the bolt 7 above referred to, to the rod 13 and interposed between the head of the bolt 7 and the square end 6ª of the rod is a washer that is slightly smaller in surface than the square end 6ª for an important purpose as will be disclosed, and interposed between the square end of the rod 13 and the angle arm 8 is a spring or series of springs 10 that by reference to Figure 8 are adapted to bear against the square end of the rod at certain times, and rest in the space between the washer and the square end at other times. It will therefore be manifest that the size of the washer is decreased at its lower end and is round in cross-section in order that pockets may be formed between the round portion and square-end to accommodate the ends of springs 10. This spring 10 bears in a square manner on the portion 6ª to hold the rod 13 in rigid manner when the rod is in a horizontal or vertical position. However, by pulling the spring up against the rod and away from the square end 6ª the rod 13 may be turned in bearing 4ª or pulled outwardly to increase the width of the carrier and particularly the length or height thereof. The spring 10 may be forced inwardly by means of the finger piece 9 and in order to retain the springs in proper position I provide the bolts 12, and the ends of the springs are secured to the angle arm 8 by means of the rivets 11 as shown.

When desired, in order to prevent rattling of the rods 13 against the bearings 4ᵇ, spring clips 15 may be employed. However, this is merely a matter of discretion.

In the practical use of the invention, the handle or finger piece 9 is compressed to release the springs 10, and then the angle arm 8 is moved upwardly until the rods 6 stand in the position shown in Figure 1. When springs 10 reach the position shown in Figure 8, they will retain the carrier in rigid upright position and prevent collapse thereof. The hooks 16 and 19 having slots 17 and 20 respectively and openings 18 and 21 are adapted to be arranged on the mud guards of the vehicle in lieu of hooks 22, when desired and ropes 23 may be stretched from these hooks to prevent casual displacement of a trunk or the like from the carrier. If desired hooks 22 may be placed on the fenders of the vehicle and in such case the hooks 16 and 19 may be dispensed with.

It will be gathered from the foregoing that when occasion demands the carrier may be ready for instant use and that the same comprises no delicate parts such as are liable to become inoperative after a short period of use.

In the future practice of the invention, such changes in the construction and arrangement of parts may be made, as fairly fall within the scope of the claims appended.

Having described my invention, what I claim and desire to secure by Letters-Patent, is:

1. In an article carrier, the combination of bearings having integral dropped portions and having apertures in said portions, a rod adapted to seat in the bearings and having rounded portions throughout its length, and upstanding portion formed integral on the rod, and a square end formed on the upstanding portion, means for securing the bearings to the underside of a vehicle, an angle arm secured to the square end of the upstanding portion, means for securing the arm to the upstanding portion, a spring interposed between the angle arm and the square end of the upstanding portion, and a washer of smaller diameter interposed between the square end and the inner end of the fastening means, and means for unseating the spring from its normal position.

2. In an article carrier, the combination of bearings, a rod arranged in the bearings, an upstanding portion formed on the rod and having a square end, an angle arm secured to the square end of the upstanding portion, a spring interposed between the arm and upstanding portion, and a washer slightly smaller at its lower end in diameter arranged adjacent the square end of the upstanding portion, and means for moving the spring from its normal position.

In testimony whereof I have hereunto set my hand in presence of two subscribing witnesses.

EUGENE SHEER.

Witnesses:
ARTHUR A. GIMBEL,
CHARLES D. TALMAGE.